Sept. 7, 1937. J. MORKOVSKI 2,092,609
TRACTOR ATTACHMENT
Filed Jan. 31, 1936 4 Sheets-Sheet 3
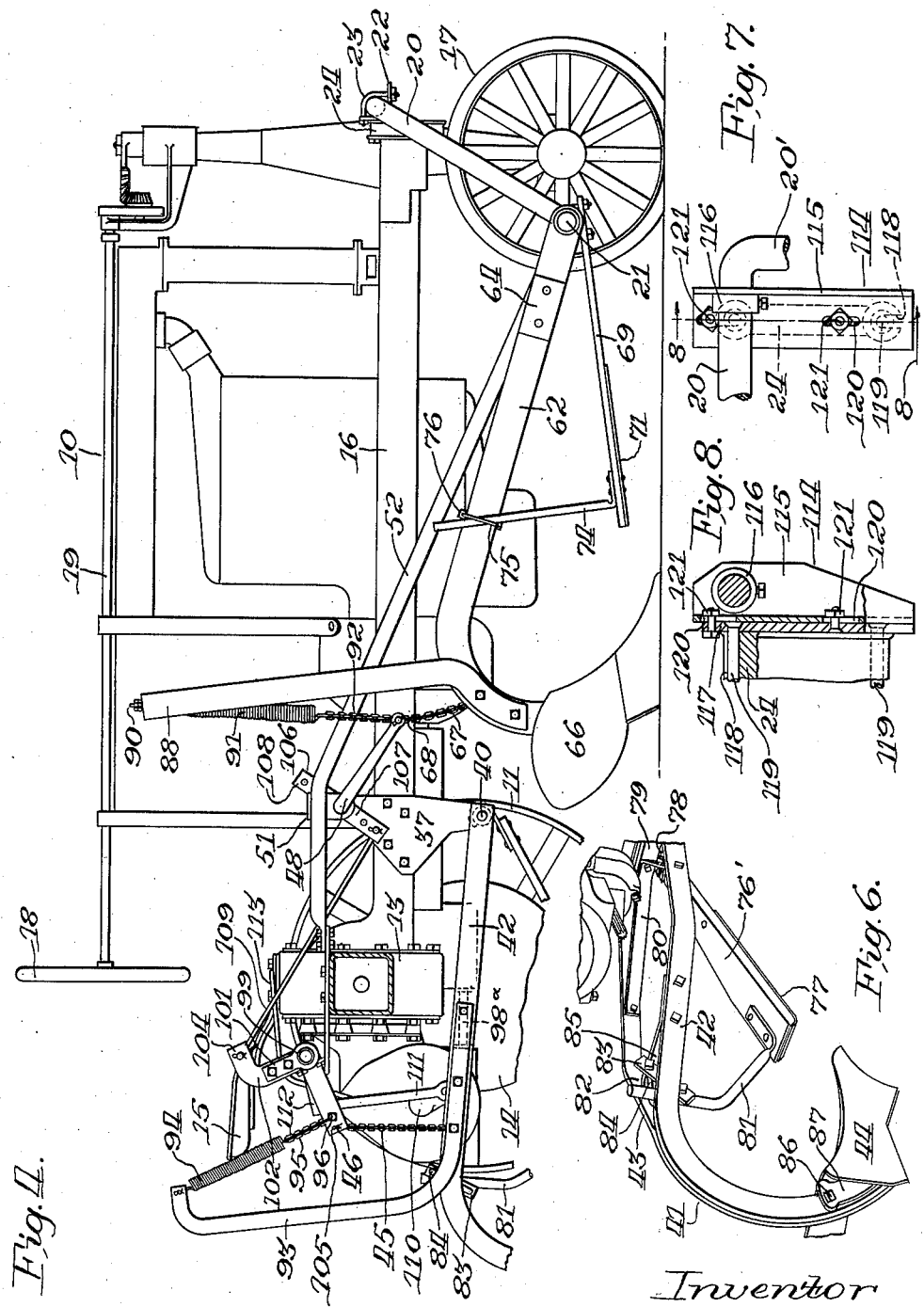
Inventor
James Morkovski

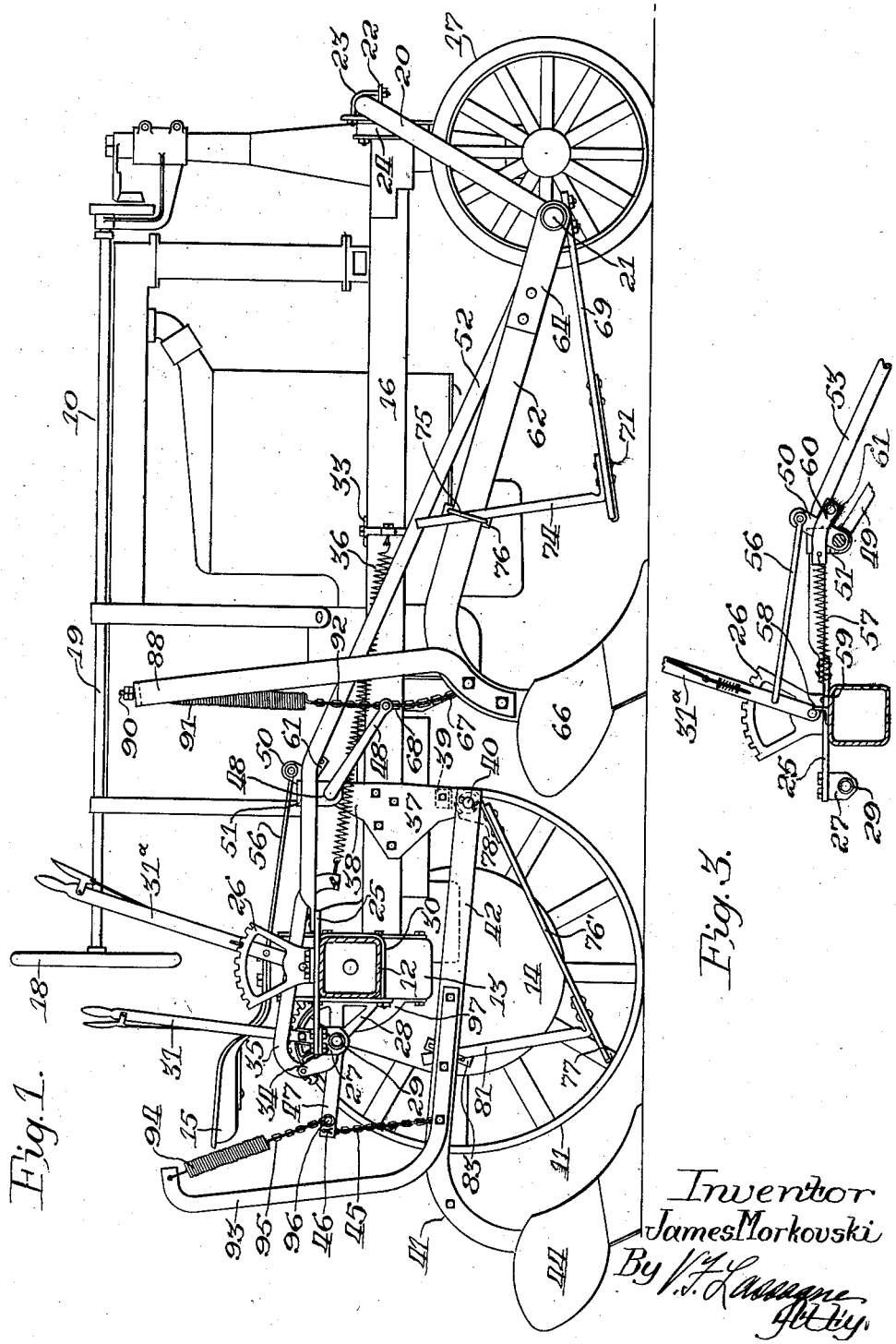

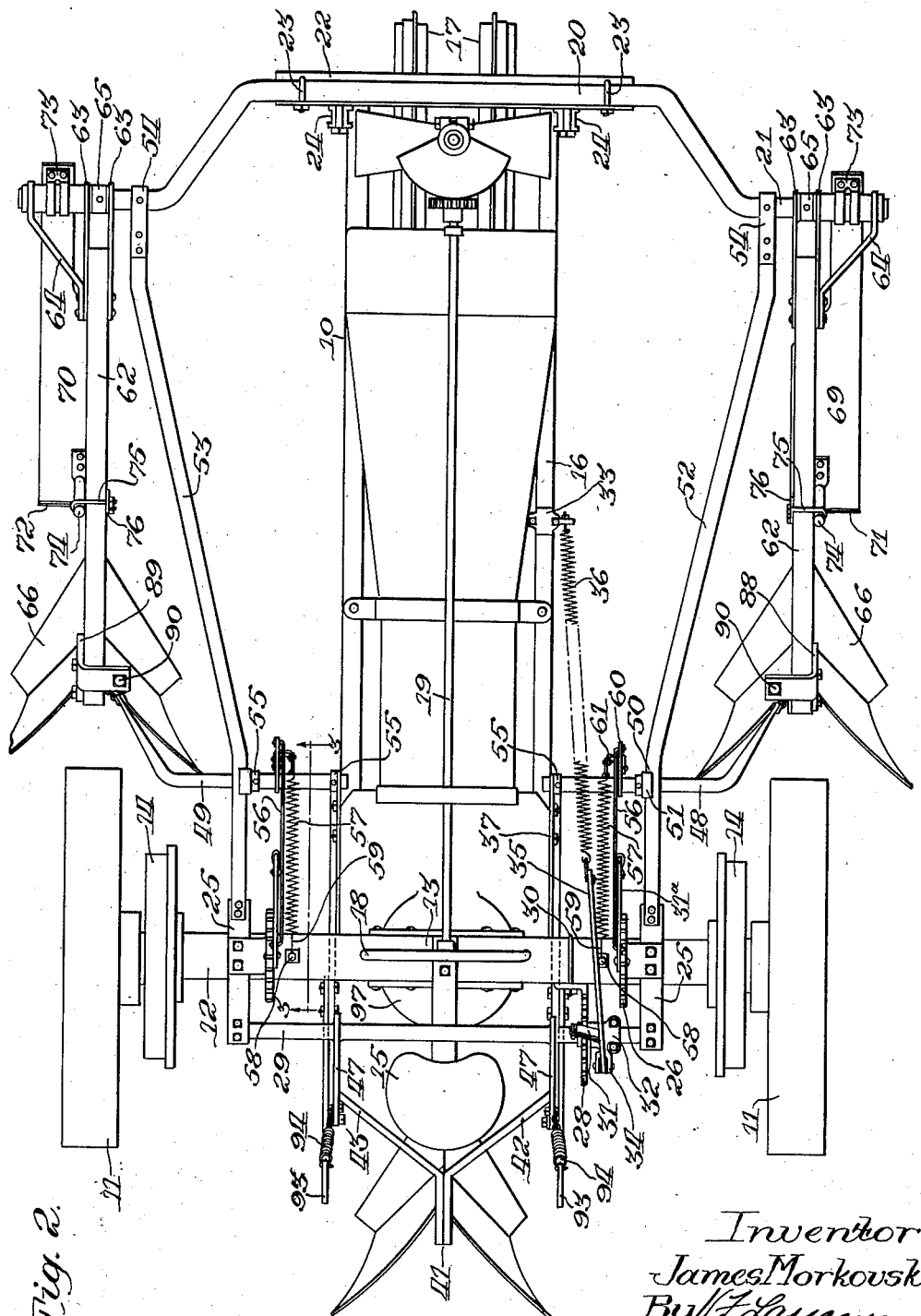

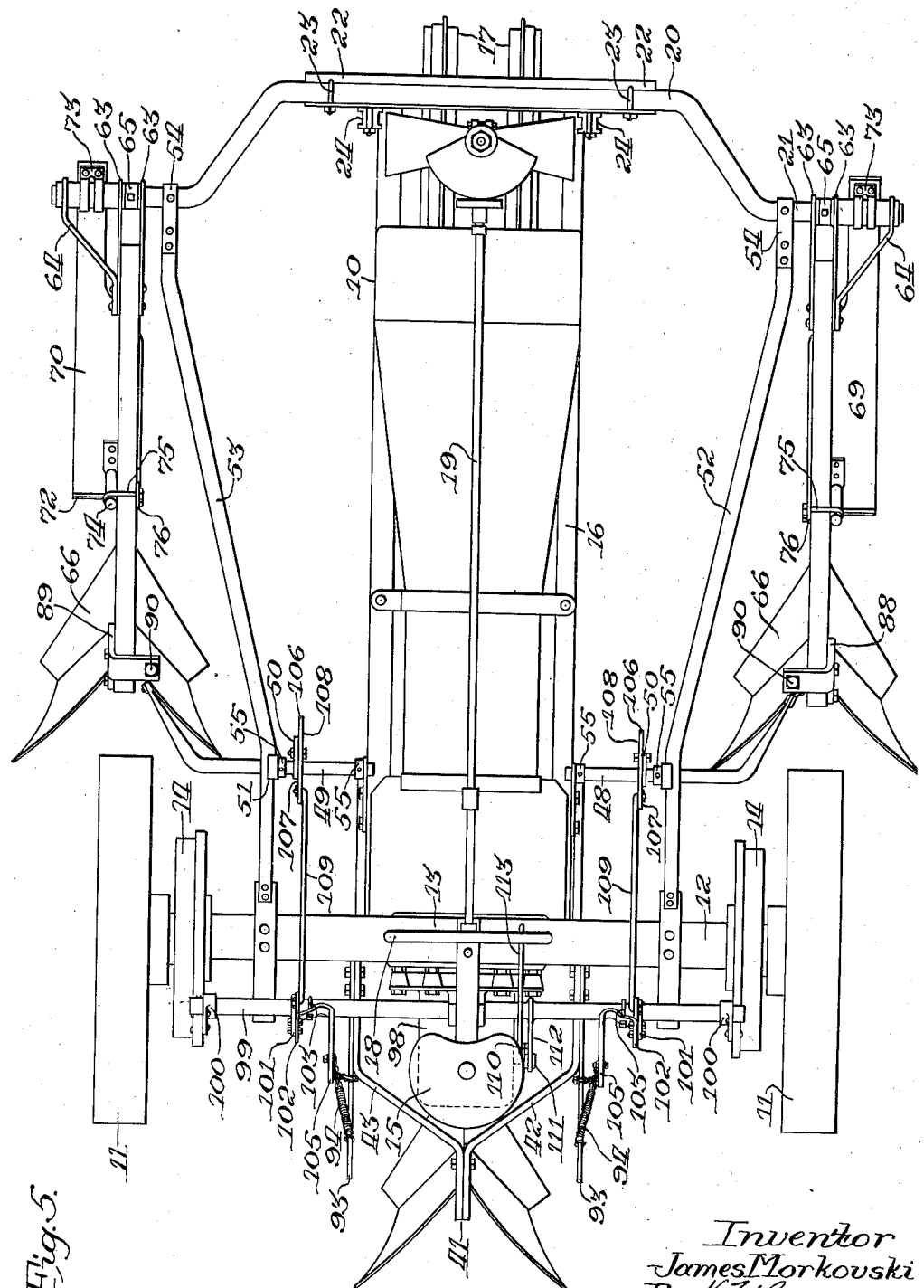

Patented Sept. 7, 1937

2,092,609

UNITED STATES PATENT OFFICE 2,092,609

TRACTOR ATTACHMENT

James Morkovski, Canton, Ill., assignor to International Harvester Company, a corporation of New Jersey Application January 31, 1936, Serial No. 61,796

11 Claims. (Cl. 97—47)

This invention relates to tractor operated tillage implements and is more particularly directed to a combination with a tractor of an attachment comprising an assembly of earth working tools designed as an attachment for the tractor.

The main object of the invention is to provide a tillage attachment especially designed for lister plowing and for use with tractors of the row crop type, which attachment will be self-governed as to depth of plowing.

Another object is to arrange furrow forming plows of the middle breaker type on an attachment in such a manner as to cooperate with tractors of the type having rear wheels spaced to straddle a space sufficient for two plant rows to simultaneously form a plurality of furrows, and to provide depth gauging means in connection with the plows that will automatically govern the depth of plowing and permit the operation of the plows in light or sandy soils.

Another object is to provide an attachment for a tractor of the tricycle type in which the rear wheels run in the furrows left by the bursting of the ridges by two laterally spaced plows, and the center plow bursts out the track of the steering truck.

Still another object is to provide means whereby the earth engaging implements are raised and lowered into operating position either by hand or by mechanism operated by the power of the engine.

Another object of the invention is to provide pressure spring attachments to increase the pressure on the bottoms.

The foregoing and other minor objects are accomplished by providing a center draft frame adapted to be attached to the rear of a tractor, and a laterally extending draft frame adapted to be attached to the forward part of a tractor, the various draft frames carrying tillage means comprising a novel arrangement of plows and depth gauging skids or runners arranged between the plows and movable jointly therewith, and operating in a manner to maintain an even depth of plowing and prevent excessive digging in of the plow units, as will hereinafter be more specifically described and then defined in the claims.

Referring to the drawings:

Figure 1 is an elevation of a tractor with the right rear wheel removed showing the middle buster attachment thereon;

Figure 2 is a plan view showing the attachment in place;

Figure 3 is a detailed view of the hand lift mounted on the rear axle housing of the tractor;

Figure 4 is a similar view of the attachment as shown in Figure 1 but operated by the power lift; and, Figure 5 is a plan view of the attachment as shown in Figure 4.

Figure 6 shows a perspective view showing the center middle buster with its skid attachment for depth adjustment;

Figure 7 is a front elevation of a modification of the front support for the middle buster attachment;

Figure 8 is a section taken along the line 8—8 looking in the direction of the arrows of the modification of the front support for the middle buster attachment.

The invention is herein disclosed in combination with a tractor 10 of the wide tread type having rear wheels 11 and an upwardly arched rear axle structure having a transverse housing 12 containing a differential 13 and lateral shafts extending therefrom, and depending housings 14 having upper portions fixed to the transverse housing 12 and containing gearing driven by the differential shafts, which in turn drive the spindles of the traction wheels 11 projecting from the outer faces of the housings 14. The central portion of the housing 12 carries a driver's seat 15. Extending forwardly from the transverse housing 12 is a tractor frame 16 on which the usual engine and transmission mechanism is supported. At the front end of the tractor frame 16, a steering truck 17 is attached. The tractor is steered by means of a steering wheel 18 operated from the operator's station through a steering shaft 19 connected to the steering truck 17 by suitable mechanism not shown.

The invention, best shown in Figures 1 and 2, which is known as a three row middle buster, hand operated, is attached to the tractor 10 which has been just described. It is to be understood that the invention may also be attached to other types of general purpose tractors having the rear wheels adjustable laterally on their axles without departing from the scope of the invention. A front draft arch 20 having downwardly and lateral extending portions 21 is attached at its center portion to a transverse member 22 and secured thereto by angle shaped bolts 23. The transverse member 22 is securely fastened to supporting brackets 24 at the forward end of the tractor frame 16. Push pipe plates 25 and lifting lever quadrants 26 are secured to the tractor's transverse housing 12. Rockshaft brackets 27 are secured to the push pipe plates 25, and a raising lever quadrant 28 has loosely mounted therein a rockshaft 29 which is pivoted in the brackets 27. The quadrant 28 is secured to the tractor's transverse housing 12 by means of a U-bolt 30. A raising lever 31 is attached to a lever arm bracket 32 which is secured to the rockshaft 29. A helper spring bracket 33 is securely attached to the tractor frame 16. A lift arm 34 is attached to and rearwardly extends from the lever arm bracket 32. A lifting spring link 35 is pivotally connected to the lift arm 34 at one end and it extends forwardly to where it attaches to a lifting spring 36 which is adjustably connected to the bracket 33. Side plate support brackets 37 triangularly shaped are secured to the center to tractor frame 16. At their lower ends, they are braced by a spreader brace 39. Beneath this side plate spreader 39, a center beam pivot shaft 40 is positioned in the brackets 37. A center beam 41 is made up of a right and left hand rearwardly and inwardly extending member 42 and 43 respectively which are joined at the center of the completed beam and then extend downwardly to form a shank to which the rear lister or middle buster is connected by a friction break shank pivoted to the shank of the center beam. The center beam 41 is pivoted at its forward end to the pivot shaft 40 and secured thereto by cotter keys in the shaft. The right and left hand members of the center beam may be securely braced at their front ends as desired, but this bracing has not been shown, as it is not necessary for the understanding of the invention. Lift chains 45 are securely fastened to the right and left hand members 42 and 43 as shown, and at their upper ends connected to pick-up hooks 46 pivoted in lifting arms 47 which are securely attached to the rockshaft 29. The depth of the lister or breaker bottom may be adjusted by positioning any one of the chain links over the pick-up hooks. There is also the adjustment into and out of working position by means of the lever 31 about the adjusting quadrant 28.

Right and left hand lifting rockshafts 48 and 49, respectively, have rigidly secured thereto lifting arms 50 which extend forwardly and upwardly. The rockshafts 48 and 49 are pivoted in depending brackets 51 securely attached to right and left hand push bars 52 and 53 which are secured at their upper ends to the push pipe plates 25 and at their lower ends to the front draft arch 20 by means of brackets 54. The push bars 52 and 53 extend forwardly and downwardly to the draft arch to take the thrust caused by the breaker bottoms when in working position. The push bars also act as a brace for laterally extending portions of the draft arch. The inner ends of the lifting rockshafts 48 and 49 are pivoted in the upper part 38 of the side plate supporting brackets 37. The pivoted rockshafts 48 and 49 are laterally adjusted for various widths of rows and secured in adjusted position by set collars 55. Raising lever links 56 are pivotally connected to the raising levers 31a which are pivoted to the adjusting quadrants 26 and to the lifting arms 50 on the rockshafts 48 and 49.

Lifting springs 57 are adjustably connected at their rear ends to spring brackets 58 by means of spring connections 59, and at their front ends are pivotally connected to spring links 60 which are pivoted to spring arms 61 secured to the lifting arms 50. Front beams 62 are pivotally attached to the front draft arch 20 by coupling brackets 63 and by lateral coupling brackets 64 whereby the beams 62 are held in their vertical position. The beams may be adjusted laterally on the front draft arch for the correct spacing of the rows and secured in their adjusted position by set collars 65. The beams 62 extend rearwardly and are downwardly bent forward of the rear wheels 11 of the tractor to form shanks to which lister or breaker bottoms 66 are attached by a friction break shank pivoted thereto. Lift chains 67 are connected to the rear end of the beams 62 and adjustably connected to pick-up hooks 68 pivotally attached to the downwardly extending portions of the rockshafts 48 and 49.

In order to prevent the lister or breaker bottoms from pulling into the ground too deeply, skid attachments or the like may be used. In this embodiment of the invention, skids are preferred, but it is not desired to limit the invention solely to the use of skids. Front right and left skids 69 and 70 preferably constructed of wood, with right and left hand plates 71 and 72 of steel attached thereto, are pivoted to the front draft arch 20 and positioned underneath the front beams 62 by hooking skid hinges 73 over the draft arch. Front skid standards 74 are secured to the skids and adjustably clamped to the beams 62 by U bolts 75 and clips 76 in order to gauge the depth of the bottoms. The skid for the rear center beam is best shown in Figure 6. Rear skid 76' with its wearing plate 77 has a hinge bracket 78 secured at its front end, and this bracket is secured to a beam spreader 79 and beam spreader brace 80. The skid 76 is adjustable in a vertical position about the hinge bracket 78 and held in adjusted position by a rear skid standard 81 secured to the skid and clamped in adjusted position by a U-bolt 82 and clip 83 to a bracket 84 which is secured to a tie brace 85 connecting the right and left hand members 42 and 43 of the center beam 41.

To obtain the correct penetration of the middle buster bottoms, the points of the shares may be raised or lowered. This adjustment is best shown in Figure 6. A bolt 86 is loosened which passes through a center leg 87 pivoted to the beam and the beam 41, and tipping the bottoms to the desired angle. If the bottom does not enter the ground, the point of the share should be tipped down; or, if the bottom penetrates too deeply, the point of the share should be raised. The bolts should be tightened securely after any adjustment is made. The serration on the serrated washer and about the bolt slot prevents the bottom from being disengaged from its adjusted position. The adjusting should be continued until the desired operating depth is attained without putting any tension on the lift chain. The other bottoms have the same mechanism to provide for the proper adjustment of the suction of the bottoms, and it is believed sufficient to describe and illustrate only one adjustment for the proper understanding of the invention.

Where soil conditions are such that sufficient penetration may not be had by adjusting the angle of the share point, pressure spring attachments may be resorted to. Right and left hand pressure spring posts 88 and 89 are secured to the downwardly extending portions of the two front beams 62. At the upper end of each spring post, there is an inwardly extending portion to which an adjustable eye bolt 90 is secured. Pivotally depending from the eye bolts 90, front pressure springs 91 in the nature of tension springs are attached thereto, and at their lower ends spring chains 92 are attached. The lower end of the chains may be adjustably connected to the pick-up hooks 68 which are pivotally attached to the rockshafts 48. The rear beam 41 has spring posts 93 secured to the right and left hand members 42 and 43. The spring posts 93 extend rearwardly and upwardly, and, at their upper ends, a portion is bent forwardly to which pressure springs 94 are pivoted by a hook on the upper end of the springs. Spring chains 95 are pivotally secured by a bolt 96 at the rear end of the lifting arms 47. The chains 95 are then adjustably secured at their upper portions to hooks on the lower ends of the springs. The tension of the springs 91 and 94 may be adjusted by hooking the springs in any of the links of the chain.

The preceding description has been directed to the hand operated middle buster. The power lift operated middle buster modification, as shown in Figures 4 and 5, will now be described. It is to be understood that only those parts specific to the power lift mechanism will be described in full as the other parts of the modification shown in Figures 4 and 5 are identical to those previously described and will be denoted by the same reference characters.

A countershaft housing cover 97 shown in Figure 1 is removed and an assembled power lift attachment 98 which need not be described for the understanding of our invention is securely attached to the transverse housing 12 and operatively connected to power take-off mechanism 98a of the tractor by suitable gearing, not shown. Instead of the rockshaft 29, a lower lift rockshaft 99 is transversely supported between the depending housings 14 of the tractor at their upper ends by bearing brackets 100 attached thereto. The rockshaft 99 has two symmetrically spaced, rearwardly and upwardly extending lift arms 101 secured thereto to which power lift raising arms 102 are secured and also clamped to the rockshaft 99 by U-bolts and clips 103. The power lift raising arms 101 have an upwardly extending portion 104 and a lower rearwardly extending portion 105, and it is to these portions 105 of the raising arms 101 that the pick-up hooks 46 are pivoted in the usual manner. The lift chains 45 are adjustably connected to the pick-up hooks 46 as previously described. The spring chains 95 of the pressure spring attachment are connected by the hook bolts 96 to the lower portion 105 as best shown in Figure 4. The right and left hand lifting rockshafts 48 and 49 are partially removed and power lift raising arms 106 are attached to the lift arms 50. The rockshafts are then replaced and secured in positions. The power lift raising arms 106 have a lower rearwardly extending portion 107 and an upper extending portion 108. The lower and upper portions 107 and 108 are provided at their ends with holes for further adjusting the amount of lift. The portion 108 is used when the hand lift attachment is desired while the lower portion 107 is used with the power lift attachment. A power lift link 109 pivotally connects the raising arms 102 on the rockshaft to the lower portion 107 of the lift arms 106 on the lifting rockshafts 48 and 49. The power lift attachment 98 is connected to the rockshaft 99 through a lifting crank 110 to which a pitman link 111 is pivotally connected at its lower end and at its upper end to a lifting arm 112 extending rearwardly from the rockshaft 99 and securely fastened thereto. The power lift attachment 98 is thrown into and out of engagement when the tractor motor is running by a shifting lever 113 extending forwardly within easy reach of the operator's station.

Figures 7 and 8 show a modification of the front support for the middle buster attachment as shown in Figures 1, 2, 4, and 5. With the front support, as shown in Figures 6 and 7, the front hitch connection of the front beams may be adjusted vertically whenever it is necessary at different periods of the cultivation.

In Figures 7 and 8, a front draft arch 20' which is similar to the draft arch 20, as previously disclosed and described, is supported laterally on the front end of the tractor in angular supporting members 114. These members are right and left handed and only one need be described. The front draft arch 20' is pivotally supported in a forwardly extending leg 115 of the supporting members 114 at their upper ends. Lateral movement of the draft arch 20' is prevented by adjusting collars 116 engaging the inner side of the forwardly extending legs 115. The supporting members 114 are adjustably mounted for vertical movement on a support 117 which is secured to the supporting brackets 24 on the front end of the tractor. These supporting members 117 may be quickly attached to and detached from the tractor by slots 118 in the brackets 24 and bolts 119 positioned in the slots 118. The angular supporting members 114 may be adjusted vertically on the supports 117 by slots 120 and bolts 121. It is, therefore, readily understood that the draft arch 20' may be adjusted vertically with respect to the tractor and in turn the forward portions of the beams 62 which are connected to the draft arch will in turn be adjusted vertically. No adjustment of any of the members, such as the push bars 52 and 53 is needed. The flexibility of these members along with their attaching parts provide for the slight vertical adjustment of several inches which is all that is needed.

A practical tractor mounted middle buster attachment has been invented and modifications of mechanism for hand and power lift operation have been illustrated and described. In the operation of the middle buster after it has been attached to the tractor and the bottoms adjusted, as previously described for correct spacing of ridges, and suction of the soil, the depth of the middle buster bottoms when the operator is using the apparatus in the field may be easily adjusted in the modification shown in Figures 1 and 2 by the hand levers 31 and 31a conveniently located next to the operator's station 15 and connected to the beams on which the bottoms are located, as previously described. When transporting, the bottoms may be raised entirely out of the ground and locked in transporting position by the same mechanism. When the power lift attachment is used, the operator simply by throwing the operating lever 113 into and out of engagement when the tractor motor is running may raise or lower the bottoms by the system of levers previously described and illustrated in Figures 4 and 5 into transporting or soil engaging position. The power lift attachment may be operated while the tractor is either in motion or standing still.

It will be obvious to those familiar with lister cultivation that the novel arrangement of plows and traction wheels herein disclosed affords a structure particularly well adapted for lister plowing. When the soil is heavy and only two plows can be used, the spacing of the traction wheels and plows will be such as to work alternate ridges, the ridge which is straddled at one traverse of the field being plowed on the next or return traverse. When three plows can be used, the arrangement of the attachment is such that an intermediate or third plow can be quickly added and their ridges at standard spacing operated on at each traverse.

It will be evident that there has been provided an attachment which may be readily connected to and disconnected from the tractor at the front and rear portions thereof for subsequent attaching of other tractor mounted implement attachments, and that said attachment which has been disclosed affords an organization particularly well adapted for lister plowing and middle busting. It is to be understood that materials suitable for the stresses encountered in an implement of this nature are to be used. The preferred embodiment of the invention herein described is capable of certain modifications without departure from the scope of the invention to be defined in the following claims.

What is claimed is:

1. The combination with a wheel supported vehicle having an engine, of an implement attachment comprising a plurality of ground engaging tools, said tools being located, respectively, longitudinally of the vehicle and in alignment with the wheels of the vehicle, a draft arch on the vehicle to which said tools are connected, means for adjusting the draft arch vertically, push bars connected to the draft arch at their forward ends and to the wheel supported vehicle at their rear ends, means for raising and lowering said ground engaging tools, and means adapted to be intermittently operated from the engine for actuating said raising and lowering means.

2. The combination with a tractor, of an implement beam, said implement beam extending longitudinally of the tractor, a transversely extending draft member, means for pivotally connecting said implement beam to said draft member, a vertically mounted member secured to the rear of said implement beam, means for raising and lowering said implement beam, and substantially vertical pressure means connecting said vertically mounted member to said raising and lowering means.

3. The combination with a tractor having an engine, of an implement beam, said implement beam extending longitudinally of the tractor, a tranversely extending draft member mounted on said tractor, means for pivotally connecting said implement beam to said draft member, a vertically mounted member secured to the rear of said implement beam, means for raising and lowering said implement beam, substantially vertical resilient means connecting said vertically mounted member to said raising and lowering means, and means adapted to be intermittently operated from the engine for actuating said raising and lowering means.

4. The combination with a wheel supported vehicle, of an implement beam, said implement beam extending longitudinally of the vehicle, a transversely extending draft member, means for pivotally connecting said implement beam to said draft member, a vertically mounted member secured to said implement beam, means for raising and lowering said implement beam located in a plane substantially midway between the upper extremities of said vertically mounted member and the implement beam to which its lower end is secured, and pressure means connecting the upper end of said vertically mounted member to said raising and lowering means.

5. The combination with a wheel supported vehicle, of a plurality of implement beams, said implement beams extending, respectively, longitudinally of the vehicle and in alignment with the wheels of the vehicle, a transversely extending draft arch having laterally extending portions to which said beams are connected, means for laterally adjusting said implement beams on said laterally extending portions, lifting crank members mounted on the vehicle for reciprocatory movement, and means for adjusting said lifting crank members axially, whereby said implement beams may be adjusted laterally with respect to said vehicle.

6. The combination with a wheel supported vehicle, of a plurality of implement beams, said implement beams extending, respectively, longitudinally of the vehicle and in alignment with the wheels of the vehicle, a transversely extending draft arch having laterally extending portions to which said beams are connected, means for laterally adjusting said implement beams on said laterally extending portions, push bars connecting said laterally extending portions of said draft arch to the vehicle, means for laterally adjusting said implement beams on said laterally extending portions, lifting crank members supported on said vehicle and said push bars for reciprocatory movement, and means for adjusting said lifting crank members axially, whereby said implement beams may be adjusted laterally with respect to said vehicle.

7. The combination with a wheel supported vehicle, of a plurality of implement beams, said implement beams extending, respectively, longitudinally of the vehicle and in alignment with the wheels of the vehicle, a transversely extending draft arch having laterally extending portions mounted forwardly on said vehicle, a central draft member, means for connecting one of said implement beams to said central draft member, means for connecting an implement beam to each one of said laterally extending portions of said draft arch, a rockshaft mounted at the rear of the vehicle for reciprocating movement, means connecting said centrally located implement beam to said rockshaft, means for laterally adjusting said implement beams on said laterally extending portions relative to said centrally located beam, lifting crank members mounted on said vehicle for reciprocatory movement, means for adjusting said lifting crank members axially, whereby said implement beams may be adjusted laterally with respect to said vehicle, and means for actuating said rockshaft and said lifting crank members.

8. The combination with a wheel supported vehicle having an engine, of a plurality of implement beams, said implement beams extending respectively longitudinally of the vehicle and in alignment with the wheels of the vehicle, a transversely extending draft arch having laterally extending portions mounted forwardly on said vehicle, a central draft member, means for connecting one of said implement beams to said central draft member, means for connecting an implement beam to each one of said laterally extending portions of said draft arch, a rockshaft mounted at the rear of the vehicle for reciprocatory movement, means connecting said centrally located implement beam to said rockshaft, means for laterally adjusting said implement beams on said laterally extending portions relative to said centrally located beam, lifting crank members laterally mounted on said vehicle for reciprocatory movement, means for adjusting said lifting crank members axially, whereby said laterally positioned implement beams may be adjusted laterally with respect to said central implement beam, means connecting said lifting crank members to said rockshaft, whereby the implement beams will be raised and lowered simultaneously.

9. The combination as set forth in claim 7, power lift means actuated from the engine, and means for intermittently actuating said power lift means whereby said rockshaft will be reciprocated.

10. The combination as set forth in claim 5, said vehicle having an engine, power lift means actuated from said engine, means for intermittently actuating said power lift means, and means connecting said lifting cranks to said power lift means, whereby said implement beams will be raised and lowered upon the actuation of said power lift means.

11. The combination as set forth in claim 6, said vehicle having an engine, power lift means actuated from said engine, means for intermittently actuating said power lift means, and means connecting said lifting cranks to said power lift means, whereby said implement beams will be raised and lowered upon the actuation of said power lift means.

JAMES MORKOVSKI.